H. N. TUCKER.
CHILDREN'S SLEDS.

No. 170,919.  Patented Dec. 7, 1875.

Witnesses:
Wm. D. Ward
H. W. Darling

Inventor:
Horace N. Tucker.

UNITED STATES PATENT OFFICE.

HORACE N. TUCKER, OF STOUGHTON, MASSACHUSETTS, ASSIGNOR OF ONE-HALF HIS RIGHT TO FRANCIS PACKARD, 2D, OF SAME PLACE.

IMPROVEMENT IN CHILDREN'S SLEDS.

Specification forming part of Letters Patent No. 170,919, dated December 7, 1875; application filed October 4, 1875.

*To all whom it may concern:*

Be it known that I, HORACE N. TUCKER, of Stoughton, in the county of Norfolk and State of Massachusetts, have invented a new and useful Improvement in Children's Vehicles; and I do hereby declare that the following is a full, clear, and exact description of the construction, character, and operation of the same, reference being had to the accompanying drawing, which makes part of this specification.

Figure 1:
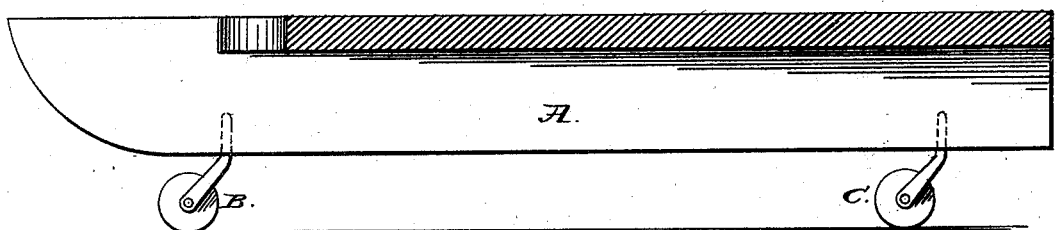
Figure 2:
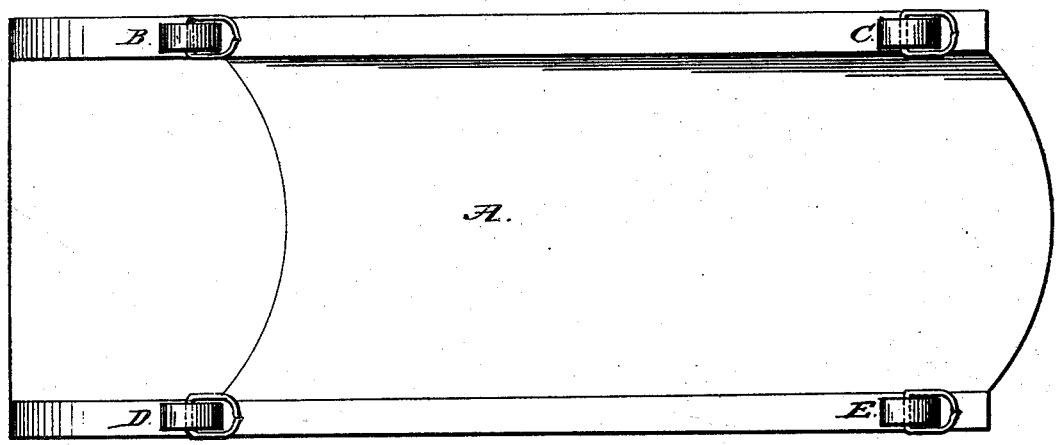

Figure 1 is a plan view of the vehicle, showing the sled mounted upon casters, in which consists the improvement.

I make this vehicle by boring holes in the lower edges of the runners of the sled A, and driving in or otherwise attaching the casters B C D E, by the aid of which it is easily propelled and turned in any direction, to the great delight and amusement of children using it.

The object of my improvement is to furnish a safe and attractive vehicle for the amusement of children of tender age and health, who are debarred the privilege of out-door winter sports. The vehicle can be used by them as a coasting-sled on the floors of the nursery or parlor, &c., and also to convey them about the room by others.

What I claim as my invention, and desire to secure by Letters Patent, is—

A child's sleigh or sled constructed as described, and provided with casters B, C, D, and E, in the manner and for the purpose set forth.

HORACE N. TUCKER.

Witnesses:
WM. D. WARD,
H. W. DARLING.